Sept. 25, 1934.     R. P. LANSING     1,975,047
ENGINE STARTING MECHANISM
Filed Oct. 20, 1932     2 Sheets-Sheet 1
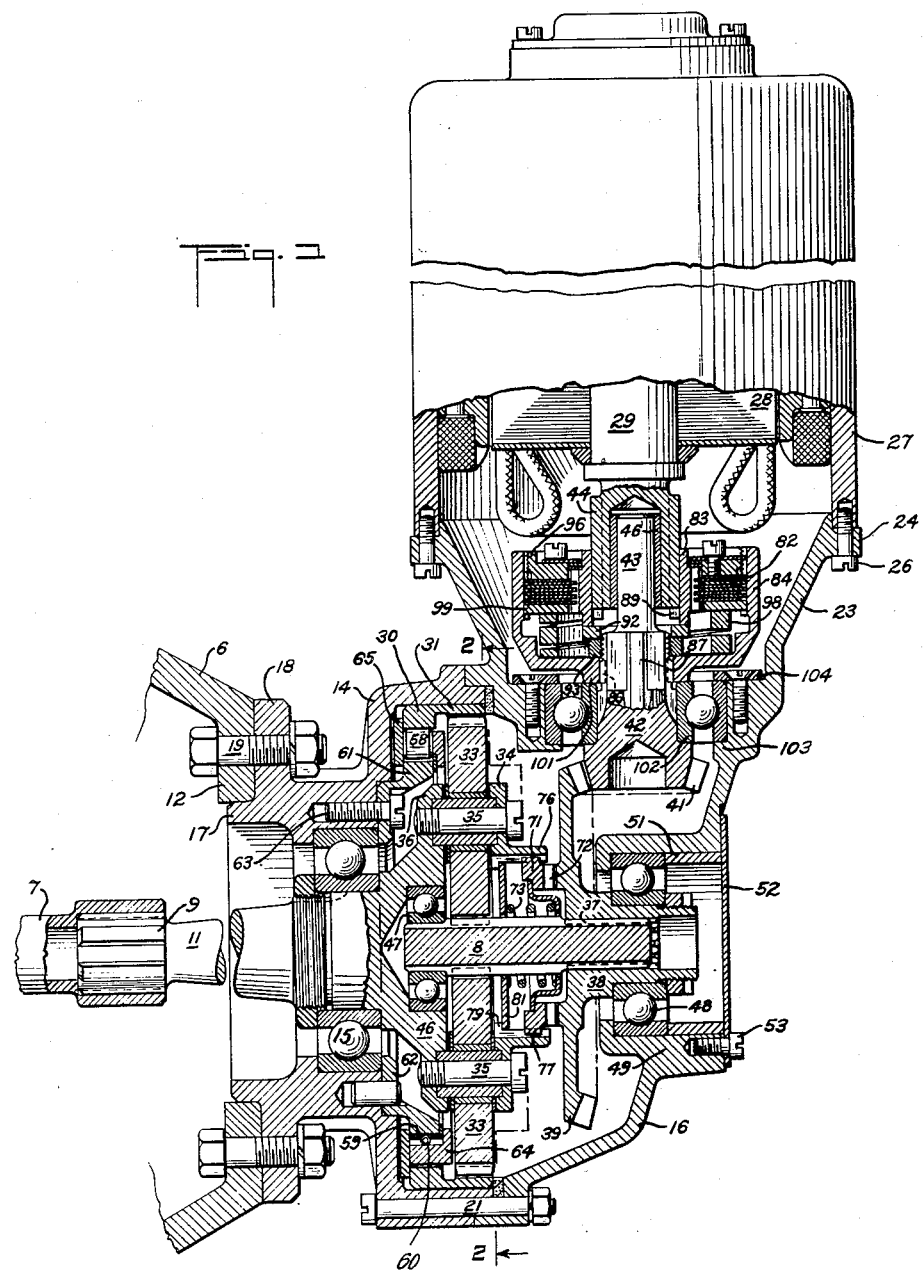
INVENTOR.
Raymond P. Lansing
BY Martin J. Finnegan
ATTORNEY.

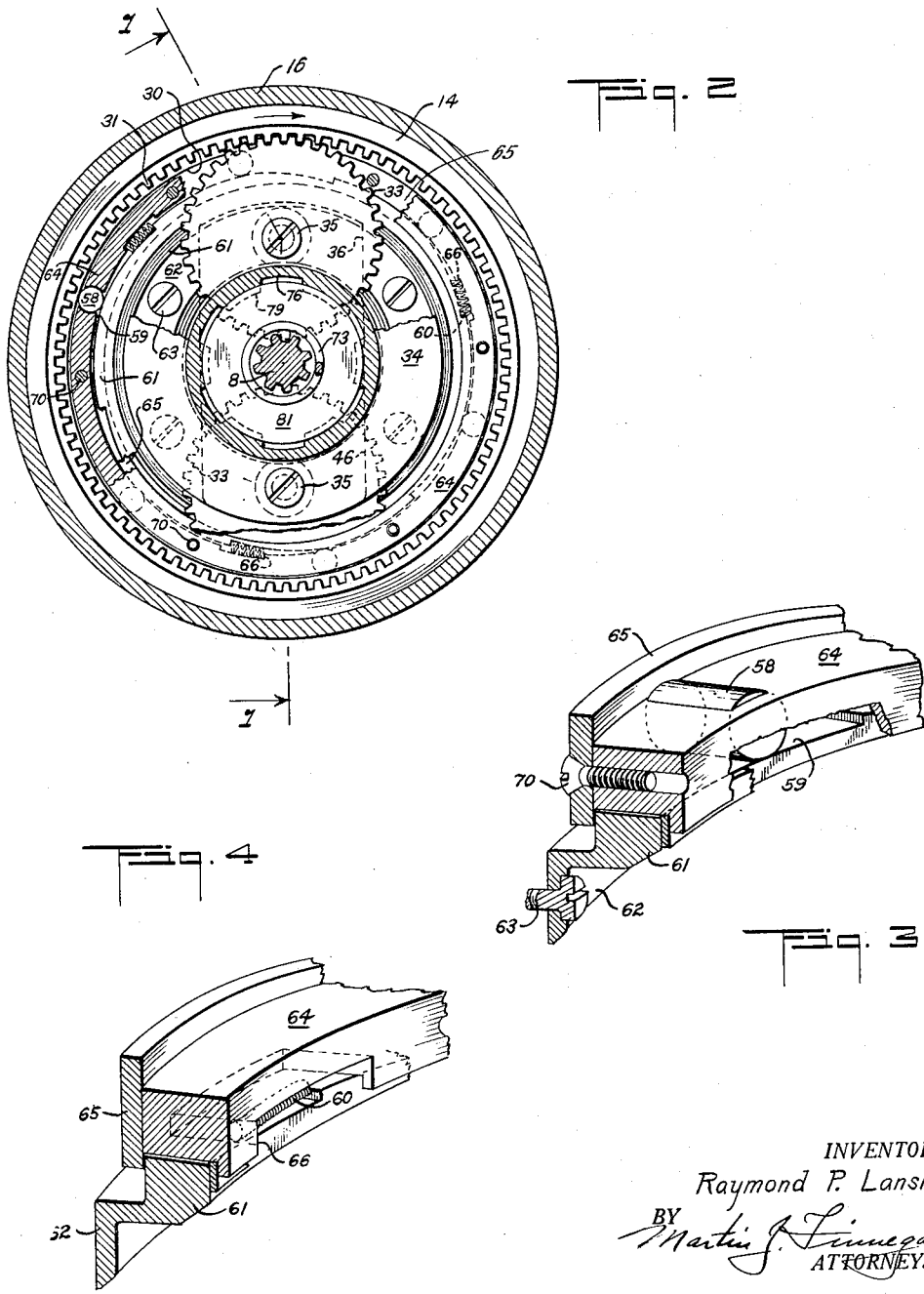

Patented Sept. 25, 1934

1,975,047

UNITED STATES PATENT OFFICE 1,975,047

ENGINE STARTING MECHANISM

Raymond P. Lansing, Montclair, N. J., assignor, by mesne assignments, to Eclipse Aviation Corporation, East Orange, N. J., a corporation of New Jersey Application October 20, 1932, Serial No. 638,796

8 Claims. (Cl. 74—7)

This invention relates to a mechanism for use with internal combustion engines and capable of functioning, first, to start an internal combustion engine by application of torque thereto, and thereafter to convert part of the power developed in the engine into electrical energy available for ignition, lighting, radio transmission purposes, etc.

An object of the invention is to provide novel mechanism of the foregoing character, adapted to be mounted on the engine crankcase in constant operative engagement with an extension of the engine crankshaft, the arrangement being such that the engine is started by energy derived from an external electrical source, such as a storage battery, which source may thereafter be recharged by the device operating as a generator driven by the engine.

Another object of the invention is to provide a novel construction wherein either of two shafts, as for example the shaft of a dynamo-electric machine and the crankshaft of an internal combustion engine may drive the other, but wherein the speed ratio of the shafts is automatically changed whenever the driving function is transferred from one to the other.

A further object of the invention is to provide an advantageous organization of elements for effecting this speed ratio-change automatically characterized by the use of a novel arrangement and combination of overrunning clutch mechanisms, one of which includes permanently fixed elements, and the other of which includes a releasable ratchet mechanism cooperating with the first named clutch mechanism through the intermediary of a planetary transmission common to both.

These and other objects and features of the invention will become apparent upon consideration of the following detailed description, and upon reference to the accompanying drawings illustrating the preferred embodiment of the invention. It is to be understood, however, that the drawings are illustrative only, and are not intended as definitions of the limits of the invention, reference being had to the appended claims for such a definition of limits.

In the drawings,

Fig. 1 is a view in elevation and for the most part in axial section of a device embodying the invention;

Fig. 2 is a transverse sectional view taken substantially along the line 2—2 of Fig. 1;

Fig. 3 is a perspective view of one of the clutch assemblies, with parts broken away and sectioned; and Fig. 4 is a similar view, taken further along the periphery of the clutch cage.

Referring first to Fig. 1 there is shown therein a portion 6 of the crankcase of an engine having therein a shaft 7 constituting a part of the engine crankshaft, or a member connected therewith. As shown, shaft 7 has a splined socket portion comprising a number of internal splines 8 adapted for constant operative engagement with corresponding splines 9 formed on the surface of a transmission shaft 11 to be further described.

The crankcase 6 is preferably provided with an inwardly turned flange 12, the inner edge of which forms a circular opening concentric with the axis of the shaft 11. The dynamo transmission unit is preferably housed in a sectional casing including interlocking sections 14 and 16, the section 14 having a recess for a bearing 15 for supporting shaft 11, and a pilot portion 17 and flange 18 adapted to register with the flange 12 of the crankcase and be held thereto by suitable means 19. Similar fastening means 21 connect the registering end surfaces of the sections 14 and 16, the latter having an upwardly extending outwardly flaring portion 23 provided with a circumferential flange 24 adapted to support and hold in place, by the provision of fastening means 26, the casing 27 of the dynamo 28.

The means for drivably connecting the rotor shaft 29 of the dynamo with the transmission shaft 11 preferably includes an internally toothed annular gear 31 fitting within the larger end of the casing section 14, and a plurality of planetary pinions 33 journalled on mounting screw 35 disposed between an annular retaining plate 34 and the flanged portion 36 in which the transmission shaft 11 terminates. The pinions 33 mesh with a sun gear integral with a pinion shaft 8, which, as shown and by preference is splined or keyed as indicated at 37, to the hub 38 of a bevel gear 39 meshing with bevel pinion 41 formed on the lower end of a shaft 42. The upper end 43 of shaft 42 is of reduced diameter and is piloted within the lower socket end portion 44 of the armature shaft 29; a spaced sleeve 46 being provided to facilitate relative rotation between the two shafts. One end of the sun gear shaft 8 is rotatably supported within a bearing assembly 47 fitting within a pocket in the flanged portion 36 of the transmission shaft 11, while the opposite end of the shaft (as well as the bevel gear 39 in which it is received), is rotatably supported by a somewhat larger bearing assembly 48 held in position in the hub portion 49 of the casing section 16 by a sleeve 51 which is in turn retained and enclosed by a removable cover plate 52 fastened as indicated at 53.

The novel ratio changing device whereby the gearing above described functions to transmit multiplied torque from the dynamo 28 to the crankshaft 7 to start the engine, and thereafter drive the dynamo as a generator, preferably includes an overrunning clutch having an outer race 30, preferably made integral with the gear 31, such overrunning clutch acting in conjunction with a ratcheting clutch to cause the annular gear 31 to remain stationary during the cranking operation, and to rotate as a unit with the transmission shaft 11 and pinion shaft 8, after the engine has started under its own power.

As shown best in Figs. 2 and 3, the overrunning clutch includes a plurality of rollers 58 held in cage 64 to which a retaining ring 65 is secured by screws 70, the rollers corresponding in number to the number of tapering cuts 59 provided at equally spaced points on the outer periphery of an inner race 61 which is provided with an inwardly extending flange 62 securely fastened to the casing section 14 as indicated at 63.

The rollers 58 are moved into wedging position between the inner race 61 and the outer race 30 by suitable springs 60 acting on shoulders 66 of the cage when the annular gear 31 tends to rotate with the motor 28. When such wedging occurs, gear 31 takes the torque reaction and causes the planetary pinions 33 to rotate about their individual axes in an anti-clockwise direction as viewed in Fig. 2, as well as about the axis of the shaft 8. The result is that the rotary speed of the transmission shaft 11 and the planetary gear cage 34 on the one hand, is considerably less than that of the pinion shaft 8 and bevel gear 39, on the other.

In order to make this difference in rotation possible, the ratcheting clutch above referred to is provided. As shown, this consists of a ratchet toothed ring 71 normally tending to remain interlocked with correspondingly inclined ratchet teeth 72 formed on the surface of the bevel gear 39, the ring 71 being movable out of such interlocking relationship by the overrunning cam action of the teeth 72, and against the constant opposition of the compression spring 73, so long as the direction of torque transmission is from the motor to the engine—in other words, during the starting operation.

In order to guide the ratchet ring 71 in its retreat from the gear 39, the planetary gear cage 34 is provided with a central hub 76 having internal splines registering with the correspondingly splined outer rim 77 of the ratchet ring 71. As shown, the inner ends of the splines on the hub 76 are shouldered as indicated at 79 and thus act as an abutment for a disc 81 against which the inner end of the spring 73 is seated.

Driving connection between the armature shaft 29 and the pinion shaft 42 preferably includes a slipping clutch of limited torque transmitting capacity, so that the mechanism will be protected from excessive strain during the period of maximum load in the cranking process and also during moments of sudden impulsive torque thrust occurring during engine operation. As shown, the slipping clutch includes a plurality of annular friction discs 82, the inner edges of some of which are splined to a sleeve 83, and the outer edges of the others being similarly splined to the inner surface of a barrel 84, the lower end of which is operatively connected as by the splines 86 with the corresponding splines 87 on the pinion shaft 42. The sleeve 83 has similar connection, as indicated at 89, with the lower end of the armature shaft 29, while a spacer 92 is piloted over shaft 43 and adjustably supported by a nut 93 threaded to the pinion shaft 42. The torque transmitting capacity of the clutch discs 82 may be adjusted by turning a nut 96 threadedly engaging the barrel 84 and acting to maintain compressing spring 98 under predetermined stress. As shown, one end of the spring 98 abuts a pressure plate 99 associated with the discs 82 while the other end is seated on the floor of barrel 84. The latter has a downwardly extended hub 101 rotatably supported on the inner race of a bearing assembly 102 held in place in a pocket 103 of the casing section 16 by suitable retaining ring 104.

From the foregoing it will be apparent that upon energization of the motor, starting torque will be transmitted to the engine crankshaft to cause rotation of the latter at a considerably reduced speed, the path of torque transmission being by way of the clutch discs 82, barrel 84, gears 41 and 39, and planetary train consisting of the sun gear 8, planetary pinions 33, and screws 35, the annular gear 31 being held stationary by the wedging action of the rollers 58 during this cranking process. When the engine has been started by this cranking process, the resulting sudden increase in speed of the transmission shaft 11 imparts a strong thrust to the ring gear 31 through the planetary pinions 33, the direction of which thrust is such as to tend to rotate the annular gear in the same direction as that in which the retainer 34 rotates, to wit, the direction indicated by the arrow in Fig. 2. At the same instant the ratchet ring 71 locks with the ratchet teeth on gear 39 due to the fact that ring 71 is subject to the same acceleration as the transmission shaft 11 by virtue of its positive connection therewith through the instrumentality of retainer 34. The result of this interlocking of the member 34 and ring 71 on the one hand, and the gear 39 and shaft 8 on the other, is to render impossible relative rotation between the individual elements of the planetary combination.

The rollers 58 are thus carried out of wedging position and into free positions within the deeper portions of the inner race, in which positions they do not interfere with the rotation of the retainer 34, pinions 33, ring gear 31, and pinion shaft 8, as a unit, with all these elements rotating at the same speed. Accordingly, the only change in ratio between the speed of the engine crankshaft 7, and that at which the armature shaft 29 will now be driven is that brought about by the difference in the diameter between the bevel gears 39 and 41, and the possible occasional slipping of the clutch 82. The dynamo 28 will thus be operated at a speed somewhat higher than that of the engine member 7; but the difference will not be so great as during the cranking process.

It is to be understood however, that the invention is not limited to the particular speed relationships illustrated, nor is it essential to adhere to the specific clutch structure and locations indicated. For example, it is within the scope of the invention herein claimed to provide a torque limiting clutch at a point intermediate the gearing and the engine member 7 in addition to, or in place of, the slipping clutch shown at 82 or to dispense with such torque limiting means entirely. Likewise other changes in the construction, relative location, and number of parts may be made within the scope of the broadest of the appended claims.

What is claimed is:

1. In a starter for internal combustion engines, a shaft connected to the engine, a clutch having inner and outer races concentric with said shaft, an internally toothed gear integral with said outer race, a plurality of planetary gears drivably connected with said shaft and constantly meshed with said internally toothed gear, means holding said internally toothed gear stationary during the cranking process, means operative when the engine shaft speed exceeds that of said planetary gears to render said holding means ineffective, said last named means including a carrier for said planetary gears, a driving member, and a ratchet connection between said driving member and carrier which over-runs during the cranking process but locks when the engine starts.

2. In a starter for internal combustion engines, a shaft connected to the engine, an internally toothed gear normally rotatable with said shaft, a plurality of planetary gears mounted on said shaft and constantly meshed with said internally toothed gear, means holding said internally toothed gear stationary during the cranking process, means operative when the engine shaft speed exceeds that of said planetary gears to render said holding means ineffective, said last named means including a carrier for said planetary gears, a driving member, and a ratchet connection between said driving member and carrier which over-runs during the cranking process but locks when the engine starts.

3. In a starter for internal combustion engines, a shaft connected to the engine, a clutch having inner and outer races concentric with said shaft, an orbit gear, a plurality of planetary gears drivably connected to said shaft and constantly meshed with said orbit gear, means holding said orbit gear stationary during the cranking process, means operative when the engine shaft speed exceeds that of said planetary gears to render said holding means ineffective, said last named means including a carrier for said planetary gears, a driving member, and a ratchet connection between said driving member and carrier which over-runs during the cranking process but locks when the engine starts.

4. In a starter for internal combustion engines, a shaft connected to the engine, an orbit gear normally rotatable with said shaft, a plurality of planetary gears drivably connected to said shaft and constantly meshed with said orbit gear, means holding said orbit gear stationary during the cranking process, means operative when the engine shaft speed exceeds that of said planetary gears to render said holding means ineffective, said last named means including a carrier for said planetary gears, a driving member, and a ratchet connection between said driving member and carrier which over-runs during the cranking process but locks when the engine starts.

5. In a starter for internal combustion engines, a shaft connected to the engine, a clutch having inner and outer races one of which is normally rotatable with said shaft, an orbit gear integral with one of said races, a plurality of planetary gears drivably connected to said shaft and constantly meshed with said orbit gear, means holding said orbit gear stationary during the cranking process, means operative when the engine shaft speed exceeds that of said planetary gears to render said holding means ineffective, said last named means including a carrier for said planetary gears, a driving member, and a connection between said driving gear and carrier which over-runs during the cranking process but locks when the engine starts.

6. In a starter for internal combustion engines, a shaft connected to the engine, an orbit gear normally rotatable with said shaft, a plurality of planetary gears mounted on said shaft and constantly meshed with said orbit gear, means holding said orbit gear stationary during the cranking process, means operative when the engine shaft speed exceeds that of said planetary gears to render said holding means ineffective, said last named means including a carrier for said planetary gears, a driving member, and a connection between said driving member and carrier which over-runs during the cranking process but locks when the engine starts.

7. In a starter for internal combustion engines, a shaft connected to the engine, a clutch having driving and driven parts, one of which is normally rotatable with said shaft, an orbit gear integral with one of said clutch parts, a plurality of planetary gears drivably connected to said shaft and constantly meshed with said orbit gear, means holding said orbit gear stationary during the cranking process, means operative when the engine shaft speed exceeds that of said planetary gears to render said holding means ineffective, said last-named means including a carrier for said planetary gears, a driving member, and a connection between said driving member and carrier which overruns during the cranking process but locks when the engine starts.

8. In a starter for internal combustion engines, a shaft connected to the engine, a clutch having driving and driven parts concentric with said shaft, an orbit gear integral with one of said clutch parts, a plurality of planetary gears drivably connected to said shaft and constantly meshed with said orbit gear, means holding said orbit gear stationary during the cranking process, means operative when the engine shaft speed exceeds that of said planetary gears to render said holding means ineffective, said last-named means including a carrier for said planetary gears, a driving member, and a connection between said driving member and carrier which overruns during the cranking process but locks when the engine starts.

RAYMOND P. LANSING.